US011244592B2

(12) United States Patent
Lee et al.

(10) Patent No.: US 11,244,592 B2
(45) Date of Patent: Feb. 8, 2022

(54) DISPLAY DEVICE AND IMAGE PROCESSING METHOD IN THE DISPLAY DEVICE

(71) Applicant: LG Display Co., Ltd., Seoul (KR)

(72) Inventors: Joonhee Lee, Paju-si (KR); Dongwon Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/108,545

(22) Filed: Dec. 1, 2020

(65) Prior Publication Data

US 2021/0174727 A1 Jun. 10, 2021

(30) Foreign Application Priority Data

Dec. 4, 2019 (KR) ........................ 10-2019-0159701

(51) Int. Cl.
*G09G 3/20* (2006.01)
*G09G 3/3291* (2016.01)
*G02B 27/01* (2006.01)

(52) U.S. Cl.
CPC ......... *G09G 3/2003* (2013.01); *G09G 3/3291* (2013.01); *G02B 27/0172* (2013.01); *G09G 2310/08* (2013.01)

(58) Field of Classification Search
None
See application file for complete search history.

(56) References Cited

U.S. PATENT DOCUMENTS

| 5,864,345 | A | * | 1/1999 | Wickstrom | G09G 5/02 345/603 |
| 8,787,446 | B2 | | 7/2014 | Choi | |
| 2003/0020681 | A1 | * | 1/2003 | Arita | G09G 5/02 345/88 |
| 2003/0164810 | A1 | * | 9/2003 | Kim | G09G 3/2003 345/63 |
| 2004/0263456 | A1 | * | 12/2004 | Miyachi | G09G 3/3607 345/88 |
| 2006/0170712 | A1 | * | 8/2006 | Miller | H01L 27/3218 345/695 |
| 2007/0176862 | A1 | * | 8/2007 | Kurt | G09G 5/02 345/82 |
| 2008/0043002 | A1 | * | 2/2008 | Kaehler | G09G 5/006 345/204 |
| 2008/0079815 | A1 | | 4/2008 | Choi | |
| 2018/0322822 | A1 | * | 11/2018 | Oka | G09G 3/2003 |
| 2021/0049981 | A1 | * | 2/2021 | Seiler | G06T 15/06 |

FOREIGN PATENT DOCUMENTS

KR 10-2008-0029118 A 4/2008

* cited by examiner

*Primary Examiner* — Chad M Dicke
(74) *Attorney, Agent, or Firm* — Fenwick & West LLP

(57) ABSTRACT

A display device according to an embodiment is configured to include a host system subsampling and transmitting data of a first color among a plurality of colors of input image data; a timing controller interpolating the data of the subsampled first color in data received from the host system to reconstruct the image data and outputting the reconstructed image data; a display panel having a plurality of pixels connected to a gate line and a data line; and a driving circuit driving the gate line and the data line under a control of the timing controller to supply data voltages corresponding to the reconstructed image data to the plurality of pixels.

12 Claims, 14 Drawing Sheets

N=4  N=9  N=16

DISPLAY DEVICE AND IMAGE PROCESSING METHOD IN THE DISPLAY DEVICE

CROSS REFERENCE TO RELATED APPLICATIONS

The application claims the benefit of Republic of Korea Patent Application No. 10-2019-0159701, filed on Dec. 4, 2019, the entire contents of which are incorporated by reference in their entirety.

BACKGROUND

Field of Technology

The present disclosure relates generally to a display device and, more particularly, to a display device that reduces a transmission bandwidth of image data.

Description of the Related Art

A flat panel display device includes a liquid crystal display device (LCD), an electroluminescence display, a field emission display (FED), a quantum dot display panel (QD), and the like. The electroluminescent display device is divided into an inorganic light emitting display device and an organic light emitting display device according to the material of the light emitting layer. Pixels of the organic light emitting display device include an organic light emitting diode (OLED), which is a light emitting element that emits light by itself, to display an image by emitting light from the OLED.

Recently, research to increase the resolution of display devices has been continued, by releasing 8K TVs and monitor products with higher resolution than 4K TVs or monitors. In particular, a virtual reality (VR) display device enlarges an image through a lens for the purpose of immersion of a user and provides the image at a position very close to a user's eye, so that the display device is small in size. However, it is necessary to use an ultra-high resolution display panel having very high pixel per inch (PPI) so that the user is prevented from recognizing the pixels.

Since such an ultra-high resolution display device has a large amount of image data, a bandwidth of the interface between components inside the display device should naturally increase. However, in order to increase the bandwidth of the transmission interface, a higher clock should be used, the quality of wirings constituting the interface should be increased, and the data transmission/reception circuit configuration should be increased, resulting in an increase in interface cost.

SUMMARY

The embodiments disclosed herein take this situation into consideration, and an objective of this disclosure is to provide a display device that reduces an increase in a bandwidth of image data even when the resolution increases.

In addition, another object of this disclosure is to provide a display device that reduces an increase in video data bandwidth while reducing degradation of an image quality.

A display device according to an embodiment is configured to include a host system subsampling and transmitting data of a first color among a plurality of colors of input image data; a timing controller interpolating the data of the subsampled first color in data received from the host system to reconstruct the input image data and outputting the reconstructed input image data; a display panel having a plurality of pixels connected to a plurality of gate lines and a plurality of data lines; and a driving circuit driving the gate line and the data line under a control of the timing controller to supply data voltages corresponding to the reconstructed input image data to the plurality of pixels.

An image processing method in a display device according to another embodiment includes selecting, as a first color, a color with least contribution to luminance from among a plurality of colors of input image data when displaying an image frame composed by the image data; subsampling data of the first color; maintaining data of remaining colors except the first color of the plurality of colors as it is to transmit the resulting data together with the subsampled data of the first color; interpolating the subsampled data of the first color; and reconstructing the data of the remaining colors as it is to output the resulting data to a display panel of the display device together with the interpolated data of the first color.

The amount of image data to be transmitted can be reduced while minimizing degradation of an image quality, and high-resolution image data can be transmitted without configuring a high-quality interface.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention. In the drawings.

DETAILED DESCRIPTION

Hereinafter, embodiments will be described in detail with reference to the accompanying drawings.

Throughout the specification, the same reference numbers refer to substantially the same components. In the following description, when it is determined that a detailed description of a known function or configuration related to the contents of this specification may unnecessarily obscure or interfere with the understanding of contents, the detailed description will be omitted.

Since human vision is less sensitive to color movement or color shift, than to luminance, it is possible to optimize the storage or transmission of image data by separating the image into chroma information and luma information and use more luma information than detailed chroma information. Such a technique is referred to as chroma subsampling.

As the display device is becoming higher resolution, a bandwidth of an interface for transmitting and receiving data between internal components of the display device is increasing, but it is a big burden to newly design the internal interface whenever the resolution of the display device is increased.

In this disclosure, even when the resolution of the display device is increased, a configuration is provided that reduces an increase in a bandwidth of an interface between internal components of the device while reduces degradation of image quality.

Figure 1:
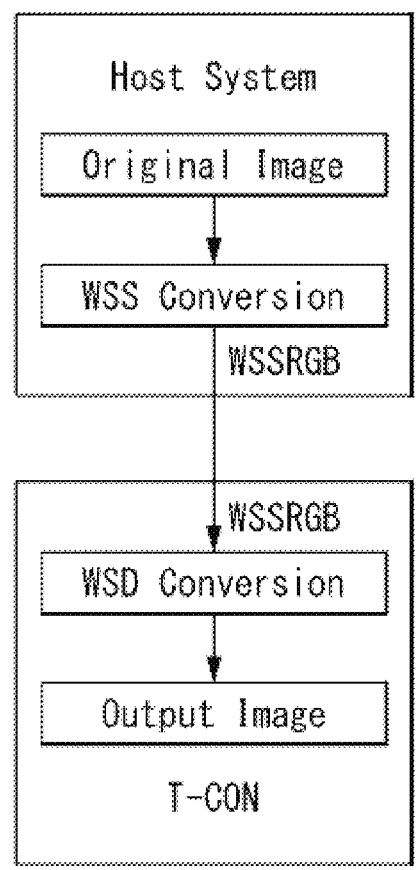
FIG. 1 is a view illustrating a configuration in which color data with low contribution to a display image within a display device is reduced and transmitted according to one embodiment.

FIG. 1 is a view illustrating a configuration in which color data with low contribution to a display image within a display device is reduced and transmitted, the configuration being provided to reduce an interface bandwidth between a source or host system providing image data and a timing controller T-CON.

The host system analyzes image data (RGB) of an input original image to select a color with the smallest sum of gradation values and thus the lowest contribution to luminance, and samples image data of the selected color once every N pixels (1:N subsampling) and maintains image data of the remaining colors as it is, thereby performing conversion into weak sub-color sub-sampling RGB (WSSRGB) data. The host system sends the WSSRGB data to the timing controller.

The timing controller analyzes the WSSRGB data provided by the host system, checks the subsampled color and the subsampling ratio, and performs a reconstruction operation, that is, a weak sub-color de-sub-sampling (WSD) conversion, to generate the reconstructed RGB data RGB'. Herein, the corresponding color data is reconstructed for each pixel by performing interpolation on data of the subsampled color through the reconstruction operation, and data of the remaining non-subsampled colors is reconstructed as it is. The timing controller outputs the reconstructed RGB data RGB' to pixels of the display panel through a data driver and a gate driver to display an image on the display panel.

Figure 2:
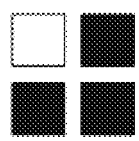
FIG. 2 is a view illustrating an example of subsampling an image block composed of N pixels at 1:N according to one embodiment.
Figure 2:
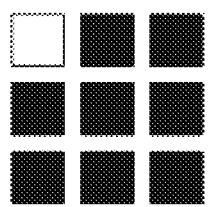
Figure 2:
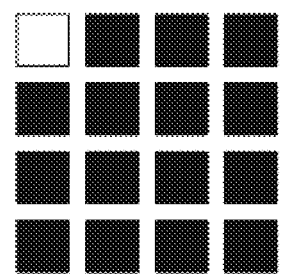

FIG. 2 is a view illustrating an example of subsampling an image block composed of N pixels at 1:N. In FIG. 2, square image blocks composed of 4, 9, and 16 pixels are illustrated, but the number of pixels included in the image block or a shape of the image block is not limited.

The subsampling at 1:N means that image data is sampled and transmitted only for one pixel and image data is not transmitted for the remaining pixels, in an image block composed of N pixels. The position of a pixel to be sampled in an image block may be fixed for all image blocks, or may be changed according to a predetermined rule for each image block.

Figure 3:
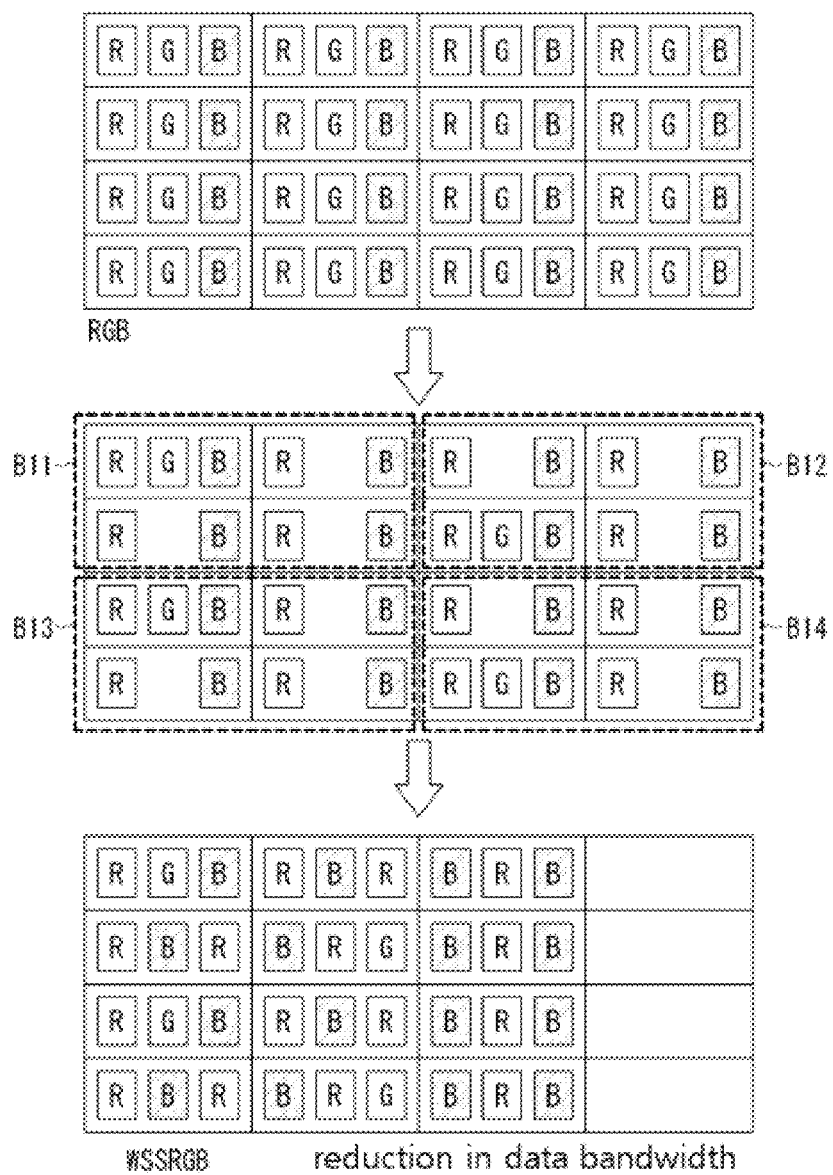
FIG. 3 is a view illustrating an example in which data bandwidth is reduced when sub-sampling and transmitting G-color image data according to one embodiment.

FIG. 3 illustrates an example in which a data bandwidth is reduced when sub-sampling and transmitting G-color image data, in which the G color (e.g., green) is sub-sampled at a 1:4 ratio in FIG. 3. In FIG. 3, in an image block composed of four pixels, the G color is sampled for only one pixel, and the G color is not sampled for the remaining pixels. In addition, the position of the G color sampled in FIG. 3 is different for each image block. In the first and third image blocks B11 and B13 on the left, the G color is sampled in a pixel at a position (1, 1), and in the second and fourth image blocks B12 and B14 on the right side, the G color is sampled in a pixel at a position (2, 1), but is not limited thereto. In FIG. 3, it may be seen that the WSSRGB generated through the subsampling has an amount of data lower than that of the original RGB data and thus a data bandwidth is reduced.

In FIG. 3, although G color image data is subsampled, R color or B color image data may be subsampled according to the input image.

Figure 4:
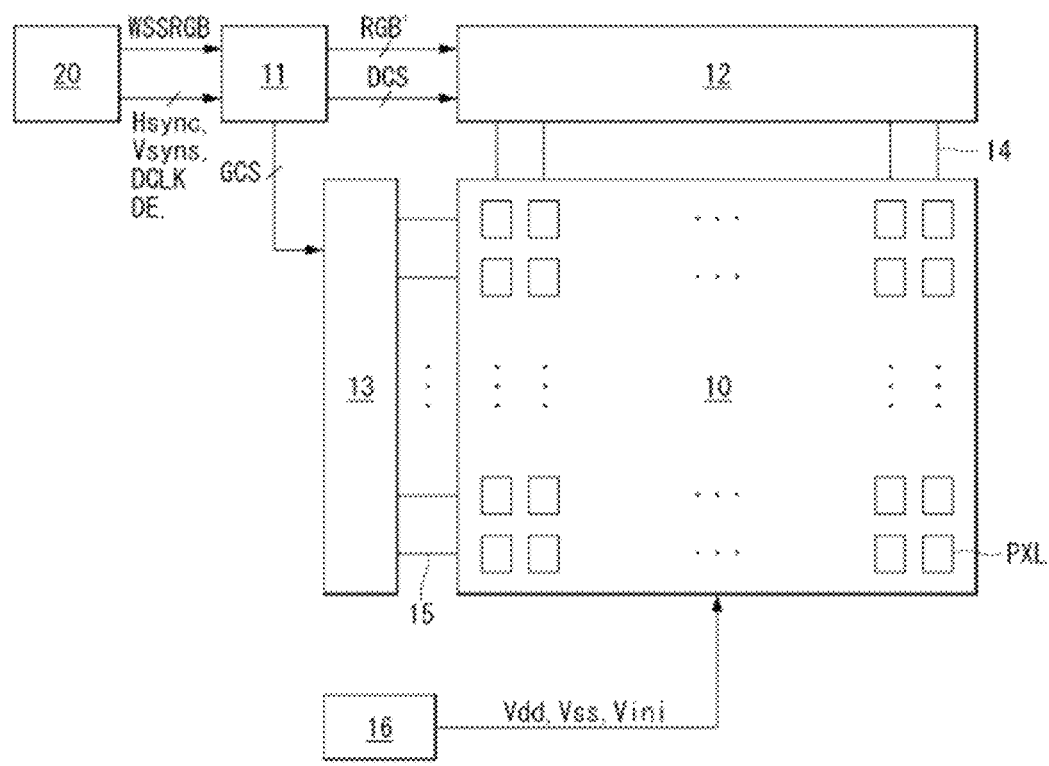
FIG. 4 is a functional block diagram illustrating a display device according to one embodiment.

FIG. 4 is a functional block diagram illustrating a display device. The display device of FIG. 4 may include a display panel 10, a timing controller 11, a data driving circuit 12, a gate driving circuit 13, a power supply unit 16, and a host system 20.

All or some of the timing controller 11, the data driving circuit 12, the gate driving circuit 13, and a power supply unit 16 in FIG. 4 may be integrated into a drive IC, and the data driving circuit 12 and the gate driving circuit 13 are combined to be configured as a single driving circuit.

On a screen where an input image is displayed in the display panel 10, a plurality of data lines 14 arranged in a column direction (or vertical direction) and a plurality of gate lines 15 arranged in a row direction (or horizontal direction) intersect with each other, and pixels PXLs are arranged in a matrix form for each intersection area, thereby forming a pixel array.

The display panel 10 in which light-emitting pixels are disposed may be provided so that the pixel array is formed in a display area on the substrate, an encapsulation layer covering the pixel array is disposed, and a sealant is applied to a non-display area on the substrate, thereby absorbing external shocks and preventing moisture from entering the pixel array.

The display panel 10 may further include a first power supply line 101 for supplying a pixel driving voltage (or high potential power supply voltage) Vdd to the pixels PXLs, a second power line 102 for supplying a low potential power voltage Vss to the pixels PXLs, an initialization voltage line 103 for supplying an initialization voltage Vini for initializing a pixel circuit, and the like. The first and second power lines 101 and 102 and the initialization voltage line 103 are connected to the power supply unit 16. The second power line 102 may also be formed in the form of a transparent electrode covering a plurality of pixels PXLs.

Touch sensors may be disposed on the pixel array of the display panel 10. The touch input may be detected using separate touch sensors or may be detected through the pixels. The touch sensors may be placed on a screen of the display panel 10 in an on-cell type or an add-on type, or implemented with in-cell type touch sensors embedded in the pixel array.

In the pixel array, the pixels PXLs arranged on the same horizontal line are connected to any one of the data lines 14 and any one of the gate lines 15 (or any one of the first gate lines 15_1 and any one of the second gate lines 15_2), thereby forming a pixel line.

The pixel PXL including a light emitting element is electrically connected to the data line 14 in response to a scan signal and a light emission signal applied through the gate line 15 to receive a data voltage and emit light from the OLED, which is the light emitting element, with a current corresponding to the data voltage. The pixels PXLs disposed on the same pixel line operate simultaneously according to the scan signal and the light emission signal applied from the same gate line 15.

Each sub-pixel composing the pixel PXL of the organic light emitting display device includes an OLED, which is a light emitting element, and a driving element that drives the OLED by supplying an electric current to the OLED according to a voltage Vgs between gate and source. The OLED includes an anode electrode, a cathode electrode, and an organic compound layer formed between these electrodes.

The organic compound layer includes a hole injection layer (HIL), a hole transport layer (HTL), an emission layer (EML), an electron transport layer (ETL), an electron injection layer (EIL), and the like. Herein, two or more organic compound layers emitting different colors may be stacked according to a tandem structure. When electric current flows through the OLED, holes passing through the hole transport layer HTL and electrons passing through the electron transport layer ETL move to the emission layer EML to form excitons, whereby the emission layer EML may emit visible light.

A pixel unit may be composed of three sub-pixels including a red sub-pixel, a green sub-pixel, and a blue sub-pixel, or four sub-pixels including a red sub-pixel, a green sub-pixel, a blue sub-pixel, and a white sub-pixel, but is not limited to thereto. A pixel unit composed of three sub-pixels will be described in this disclosure. Each sub-pixel may be implemented with a pixel circuit including an internal compensation circuit. Hereinafter, a pixel means a sub-pixel.

Figure 5:
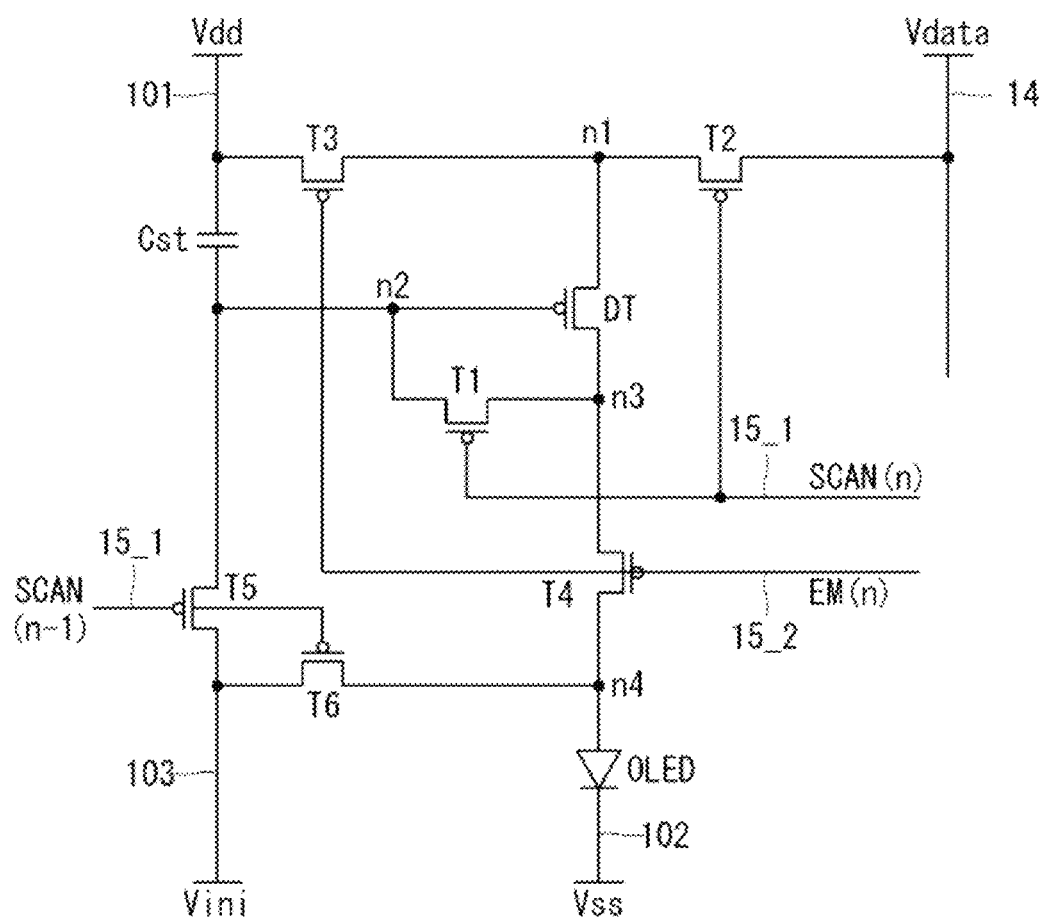
FIG. 5 is an equivalent circuit diagram illustrating a pixel included in an OLED display panel according to one embodiment.

Each sub-pixel constituting the pixel PXL receives a pixel driving voltage Vdd, an initialization voltage Vini, and a low-potential power supply voltage Vss from the power supply unit 16, and include a driving transistor, an OLED, and an internal compensation circuit. Herein, the internal compensation circuit may be composed of a plurality of switch transistors and one or more capacitors as shown in FIG. 5 described below.

The timing controller 11 interpolates the subsampled color data in the image data WSSRGB transmitted from the external host system 20 to reconstruct the image data, and reconstructs the remaining color data as it is, thereby allowing RGB' data to be generated and supplied to the data driving circuit 12.

In addition, the timing controller 11 receives timing signals such as a vertical synchronization signal Vsync, a horizontal synchronization signal Hsync, a data enable signal DE, and a dot clock DCLK from the host system, and generates control signals for controlling operation timings of the data driving circuit 12 and the gate driving circuit 13. The control signals include a gate timing control signal GCS for controlling the operation timing of the gate driving circuit 13 and a data timing control signal DCS for controlling the operation timing of the data driving circuit 12.

The data driving circuit 12 samples and latches digital video data RGB' input from the timing controller 11 to be converted into parallel data, on the basis of the data control signal DCS, performs conversion into an analog data voltage according to a gamma reference voltage through the channels, and supplies the data voltage to the pixels PXLs via the output channel and the data lines 14. The data voltage may be a value corresponding to a gradation that is to represent a pixel. The data driving circuit 12 may be composed of a plurality of source drivers IC.

Each source drive IC constituting the data driving circuit 12 may include a shift register, a latch, a level shifter, a DAC, and a buffer. The shift register shifts the clock input from the timing controller 11 to sequentially output a clock for sampling; the latch samples and latches digital video data or pixel data at a sampling clock timing sequentially input from the shift register to simultaneously output the sampled pixel data; the level shifter shifts a voltage of the pixel data input from the latch into a range of the input voltage of the DAC; and the DAC converts the pixel data from the level shifter to a data voltage on the basis of the gamma compensation voltage to be output, in which the data voltage output from the DAC is supplied to the data line 14 through a buffer.

The gate driving circuit 13 generates a scan signal and a light emission signal on the basis of the gate control signal GCS. The gate driving circuit 13 generates the scan signal and the light emission signal in a row sequential manner during an active period and sequentially provides the same to the gate line 15 connected to each pixel line. The scan signal and the light emission signal from the gate line 15 are synchronized with the supply of a data voltage from the data line 14. The scan signal and the emission signal swing between a gate-on voltage VGL and a gate-off voltage VGH.

The gate driving circuit 13 may be configured with a plurality of gate drive integrated circuits, each including a shift register, a level shifter for converting an output signal of the shift register to a swing width suitable for driving a TFT of the pixel, an output buffer, and the like. Alternatively, the gate driving circuit 13 may be directly formed on the lower substrate of the display panel 10 by a gate drive IC in panel (GIP) method. In the case of the GIP method, the level shifter is mounted on a printed circuit board (PCB), and the shift register may be formed on the lower substrate of the display panel 10.

The power supply unit 16 adjusts a DC input voltage provided from the host system 20 using a DC-DC converter, to generate a gate-on voltage VGL and a gate-off voltage VGH required for operating the data driving circuit 12 and the gate driving circuit 13, and to generate an initiation voltage Vini, a low potential power supply voltage Vss, and a pixel driving voltage Vdd required for driving the pixel array.

The host system 20 may be an application processor (AP) in a mobile device, a wearable device, and a virtual/augmented reality device. The host system 20 analyzes an input image to select a color with the lowest contribution to luminance, and subsamples only data of one pixel out of N pixels for data of the selected color and samples data of all pixels for data of the remaining colors, thereby generating WSSRGB data and supplying the same to the timing controller 11.

Figure 6:
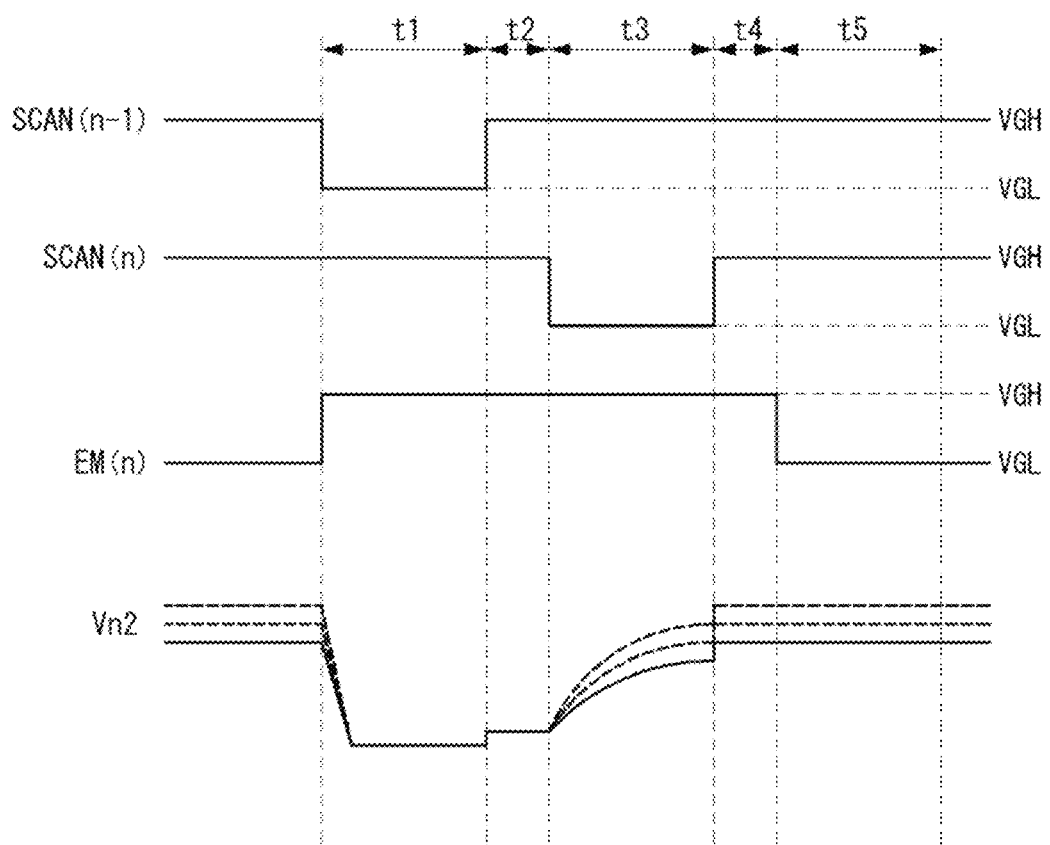
FIG. 6 is a view illustrating signals related to driving in a pixel circuit of FIG. 4 according to one embodiment.

FIG. 5 is an equivalent circuit diagram illustrating a pixel included in an OLED display panel; and FIG. 6 is a view illustrating signals related to driving in a pixel circuit of FIG. 4. The pixel circuit of FIG. 5 is only an example, and the pixel circuit to which an embodiment of this disclosure is applied is not limited to FIG. 5.

The pixel circuit of FIG. 5 includes an internal compensation circuit composed of a light emitting element OLED, a driving element DT that supplies electric current to the light emitting element OLED, a plurality of switch transistors T1 to T6, and a storage capacitor Cst, and samples a threshold voltage Vth of a driving element DT to compensate for a gate voltage of the driving element DT by the threshold voltage Vth of the driving element DT. Each of the driving element DT and the switch transistors T1 to T6 may be implemented with a P-channel transistor, but is not limited thereto. In the case of the P-channel transistor, the gate-on voltage is a gate low voltage VGL and the gate-off voltage is a gate high voltage VGH. In the case of an N-channel transistor, the gate-on voltage is the gate high voltage VGH, and the gate-off voltage is the gate low voltage VGL.

The pixel circuit of FIG. 5 is for a pixel arranged on the n-th horizontal line (or pixel line). The operation of the pixel circuit in FIG. 5 is largely divided into initialization periods t1 and t2, a sampling period t3, a data writing period t4, and a light emission period t5.

In the initialization period t1, a (n−1)-th scan signal SCAN(n−1) for supplying the data voltage to pixels of a (n−1)-th horizontal line is applied as a gate-on voltage VGL, so that fifth and sixth switch transistors T5 and T6 are turned on and thus the pixel circuit is initialized. Before a n-th scan signal SCAN(n) for controlling the supply of data to the current horizontal line is applied as a gate-on voltage VGL after the initialization period t1, a hold period t2 in which the (n−1)-th scan signal SCAN(n−1) is changed from the gate-on voltage VGL to a gate-off voltage VGH is arranged, but the hold period t2 corresponding to the second period may be omitted.

In the sampling period t3, the n-th scan signal SCAN(n) for controlling the supply of data to the current horizontal line is applied as a gate-on voltage VGL to allow the first and second switch transistors T1 and T2 to be turned on, so that a threshold voltage of the driving element (or driving transistor) DT is sampled and stored in the storage capacitor Cst.

In the data writing period t4, the n-th scan signal SCAN(n) is applied as a gate-off voltage VGH, so that the first and second switch transistors T1 and T2 are turned off and the remaining switch transistors T3 to T6 are all turned off, and a voltage of a gate electrode of the driving transistor DT rises by a current flowing through the driving transistor DT.

In the light emission period t5, the n-th emission signal EM(n) is applied as a gate-on voltage VGL to allow the third and fourth switch transistors T3 and T4 to be turned on, so that the light emitting element OLED emits light.

In order to accurately express low-gray-level luminance at a duty ratio of the emission signal EM(n), the light emission signal EM(n) swings between the gate-on low voltage VGL and the gate-off voltage VGH at a predetermined duty ratio during the light emission period t5, so that the third and fourth switch transistors T3 and T4 may repeat the on/off operation.

An anode electrode of the light emitting element OLED is connected to a fourth node n4 between the fourth and sixth switch transistors T4 and T6. The fourth node n4 is connected to an anode electrode of the light emitting element OLED, a second electrode of the fourth switch transistor T4, and a second electrode of the sixth switch transistor T6. A cathode electrode of the light emitting element OLED is connected to the second power line 102 to which the low potential power voltage Vss is applied. The light emitting element OLED emits light with electric current flowing according to the voltage Vgs between gate and source of the driving element DT. A current flow in the light emitting element OLED is switched by the third and fourth switch transistors T3 and T4.

The storage capacitor Cst is connected between the first power line 101 and the second node n2. The data voltage Vdata compensated by a threshold voltage Vth of the driving element DT is charged in the storage capacitor Cst. Since the data voltage Vdata in each of the pixels is compensated by the threshold voltage Vth of the driving element DT, a variation in characteristics of the driving element DT in the pixels may be compensated.

The first switch transistor T1 is turned on in response to a gate-on voltage VGL of the n-th scan signal SCAN(n) to connect a second node n2 with a third node n3. The second node n2 is connected to a gate electrode of the driving element DT, a first electrode of the storage capacitor Cst, and a first electrode of the first switch transistor T1. The third node n3 is connected to a second electrode of the driving element DT, a second electrode of the first switch transistor T1, and a first electrode of the fourth switch transistor T4. The gate electrode of the first switch transistor T1 is connected to a first gate line 15_1 to receive the n-th scan signal SCAN(n). The first electrode of the first switch transistor T1 is connected to the second node n2, and the second electrode of the first switch transistor T1 is connected to the third node n3.

The second switch transistor T2 is turned on in response to the gate-on voltage VGL of the n-th scan signal SCAN(n) to supply the data voltage Vdata to the first node n1. The gate electrode of the second switch transistor T2 is connected to the first gate line 31 to receive the n-th scan signal SCAN(n). The first electrode of the second switch transistor T2 is connected to a data line DL to which the data voltage Vdata is applied. A second electrode of the second switch transistor T2 is connected to the first node n1. The first node n1 is connected to the second electrode of the second switch transistor T2, a second electrode of the third switch transistor T3, and a first electrode of the driving element DT.

The third switch transistor T3 is turned on in response to the gate-on voltage VGL of the emission signal EM(n) to connect the first power line 101 to the first node n1. A gate electrode of the third switch transistor T3 is connected to the second gate line 15_2 to receive the light emission signal EM(n). A first electrode of the third switch transistor T3 is connected to the first power line 101. A second electrode of the third switch transistor T3 is connected to the first node n1.

The fourth switch transistor T4 is turned on in response to the gate-on voltage VGL of the light emission signal EM(n) to connect the third node n3 to the anode electrode of the light emitting device OLED. A gate electrode of the fourth switch transistor T4 is connected to the second gate line 15_2 to receive the light emission signal EM(n). A first electrode of the fourth switch transistor T4 is connected to the third node n3, and a second electrode of the fourth switch transistor T4 is connected to the fourth node n4.

The light emission signal EM(n) performs on/off control for the third and fourth switch transistors T3 and T4 to switch a current flow of the light emitting element OLED, thereby controlling lighting-on and lighting-off of the light emitting element OLED.

The fifth switch transistor T5 is turned on in response to a gate-on voltage VGL of the (n−1)-th scan signal SCAN(n−1) to connect the second node n2 to the initialization voltage line 103. A gate electrode of the fifth switch transistor T5 is connected to the first gate line 15_1 that supplies a scan signal to control the supply of the data voltage to pixels of the (n−1)-th horizontal line to receive the (n−1)-th scan signal SCAN(n−1). A first electrode of the fifth switch transistor T5 is connected to the second node n2, and a second electrode of the fifth switch transistor T5 is connected to the initialization voltage line 103.

The sixth switch transistor T6 is turned on in response to a gate-on voltage VGL of the (n−1)-th scan signal SCAN(n−1) to connect the initialization voltage line 103 to the fourth node n4. The gate electrode of the sixth switch transistor T6 is connected to the first gate line 15_1 for the (n−1)-th horizontal line and receives the (n−1)-th scan signal SCAN(n−1). A first electrode of the sixth switch transistor T6 is connected to the initialization voltage line 103, and a second electrode of the sixth switch transistor T6 is connected to the fourth node n4.

The driving element DT controls a current flowing through the light emitting element OLED according to a voltage Vgs between gate and source to drive the light emitting element OLED. The driving element DT includes a gate electrode connected to the second node n2, a first electrode connected to the first node n1, and a second electrode connected to the third node n3.

During the initialization period t1, the (n−1)-th scan signal SCAN(n−1) is input as a gate-on voltage VGL. The n-th scan signal SCAN(n) and the emission signal EM(n) maintain a gate-off voltage VGH during the initialization period t1. Accordingly, during the initialization period t1, the fifth and sixth switch transistors T5 and T6 are turned on so that the second and fourth nodes n2 and n4 are initialized with the initialization voltage Vini. A hold period t2 may be set between the initialization period t1 and the sampling period t3. In the hold period t2, the (n−1)-th scan signal SCAN(n−1) is changed from the gate-on voltage VGL to the gate-off voltage VGH, and each of the n-th scan signal SCAN(n) and the light emission signal EM(n) maintains its previous state.

During the sampling period t3, the n-th scan signal SCAN(n) is input as a gate-on voltage VGL. The pulse of the n-th scan signal SCAN(n) is synchronized with the data voltage Vdata to be supplied to the n-th pixel line. The (n−1)-th scan signal SCAN(n−1) and the emission signal EM(n) maintain the gate-off voltage VGH during the sampling period t3. Therefore, the first and second switch transistors T1 and T2 are turned on during the sampling period t3.

During the sampling period t3, a voltage of a gate terminal of the driving element DT, that is, the second node n2, is increased by electric current flowing through the first and second switch transistors T1 and T2. When the driving element DT is turned off, a voltage Vn2 of the second node n2 is (Vdata−|Vth|). Herein, a voltage of the first node n1 is also (Vdata−|Vth|). The voltage Vgs between gate and source of the driving element DT in the sampling period t3 is |Vgs|=Vdata−(Vdata−|Vth|)=|Vth|.

During the data writing period t4, the n-th scan signal SCAN(n) is inverted to the gate-off voltage VGH. The (n−1)-th scan signal SCAN(n−1) and the emission signal EM(n) maintain the gate-off voltage VGH during the data writing period t4. Therefore, during the data writing period t4, all the switch transistors T1 to T6 maintain an off state.

During the light emission period t5, the emission signal EM(n) continuously maintains the gate-on voltage VGL or is turned on/off at a predetermined duty ratio to swing between the gate-on voltage VGL and the gate-off voltage VGH. During the light emission period t5, the (n−1)-th and n-th scan signals SCAN(n−1) and SCAN(n) maintain the gate-off voltage VGH. During the light emission period t5, the third and fourth switch transistors T3 and T4 may repeat on/off according to the voltage of the light emission signal EM. When the light emission signal EM(n) is the gate-on voltage VGL, the third and fourth switch transistors T3 and T4 are turned on to allow electric current to flow in the light emitting device OLED. Herein, a voltage Vgs between gate and source of the driving element DT is |Vgs|=Vdd−(Vdata−|Vth|), and a current flowing through the light emitting element OLED is $K(Vdd-Vdata)^2$, in which K is a proportional constant determined by a charge mobility, a parasitic capacitance, and a channel capacity of the driving element DT.

The luminance of the light emitted by the light emitting element OLED is proportional to the current flowing through the light emitting element. When the pixel driving voltage Vdd supplied through the first power line 101 changes according to a pattern of an input image or a load, but the input data voltage Vdata remains unchanged, the luminance emitted by the light emitting device OLED varies according to the pixel driving voltage Vdd for the same data voltage Vdata.

Figure 7:
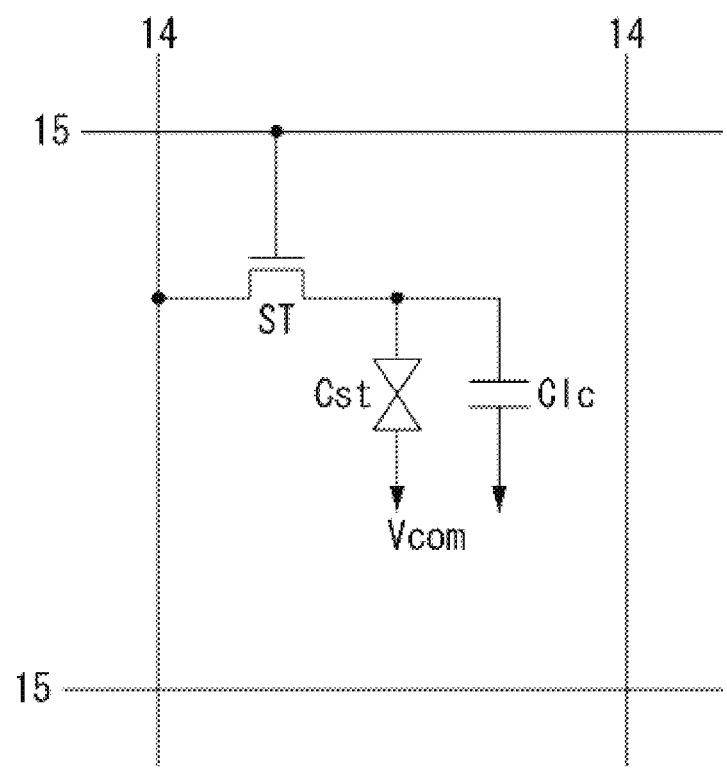
FIG. 7 is an equivalent circuit diagram illustrating a pixel included in a liquid crystal display panel according to one embodiment.

FIG. 7 is an equivalent circuit diagram illustrating a pixel included in a liquid crystal display panel, in which the liquid crystal display panel of FIG. 7 may be applied to the display panel 10.

When the display panel 10 is a liquid crystal panel, each of R/G/B sub-pixels includes a switching transistor ST connected to a data line 14 and a gate line 15, and a liquid crystal capacitor Clc and a storage capacitor Cst connected in parallel to the switching transistor ST, as shown in FIG. 7. The liquid crystal capacitor Clc charges a difference voltage between a common voltage Vcom supplied to the common electrode and a data voltage supplied to a pixel electrode through the switching transistor ST, and drives the liquid crystal according to the charged voltage to adjust light transmittance. The storage capacitor Cst keeps stable a voltage charged in the liquid crystal capacitor Clc. The power supply unit 16 generates the common voltage Vcom required for driving the liquid crystal pixels.

Figure 8:
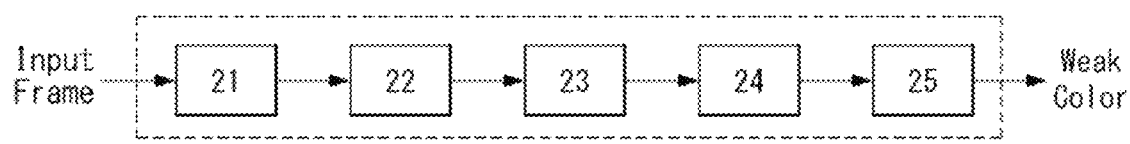
FIG. 8 is a view illustrating a configuration for selecting a subsampling color according to one embodiment.

FIG. 8 is a view illustrating a configuration for selecting a subsampling color, the configuration being included in the host system 20.

The configuration for selecting the subsampling color may include a color separator 21, a luminance domain converter 22, a summer 23, a weight calculator 24, and a color selector 25.

The color separator 21 separates an original image of the input frame into RGB channels, in which gradation data may be obtained separately for each RGB color of the image data in which gradation data of R color, gradation data of G color, and gradation data of B color are mixed in a predetermined order to be input.

The luminance domain converter 22 converts gradation data of each color channel, for example, gradation 0 data to gradation 255 data into luminance domain data. Since gradation and luminance do not match one-to-one or linearly, the gradation data may be converted to the luminance data through a predetermined conversion function (a kind of gamma function) or a table.

The summer 23 obtains sum values Rsum, Gsum, and Bsum by summing luminance data converted by the luminance domain converter 22 for all pixels constituting a frame for each color. Herein, data of a color having the lowest minimum value of luminance data in each pixel is multiplied by a predetermined minimum weight, for example, 0.5, and data of the remaining colors is not multiplied by the weight. In other words, the summer 23 expresses an area influence degree influenced by each color as a numerical value. Herein, a final sum value of a color having a lot of minimum values, i.e., a color with low contribution to luminance, is likely to be the smallest.

When the minimum weight is one, a sum of luminance data of all pixels for each color becomes the sum value. The minimum weight serves to better select a color having a lot of minimum values in pixels.

The weight calculator 24 multiplies sum values Rsum, Gsum, and Bsum of each color, which is calculated by the summer 23, by sensitivity weights Rw, Gw, and Bw corresponding to the sensitivity of human color perception. Humans respond the most to the green color, then to the red color, and respond the least to the blue color. According to BT2020, a standard of 4K/UHD recommended for ITU, which is an international broadcasting standards organization, the sensitivity weights Rw, Gw, and Bw may be about 0.2627, 0.6780, and 0.0593, respectively, but is not limited thereto.

The color selector 25 selects a color with the smallest value from weighted sum values Rw*Rsum, Gw*Gsum, Bw*Bsum of each color calculated by the weight calculator 24, as a weak color or a weak sub-color with the lowest contribution to luminance.

In the configuration of FIG. 8, the luminance domain converter 22 may be omitted.

The host system 20 may transmit data of the color selected as the weak color only to one of N pixels, and transmit data of the remaining colors to all pixels.

The host system 20 needs to transmit information about the weak color (or weak sub-color) and a subsampling ratio N of the weak color (or weak sub-color) to the timing controller 11.

To this end, the host system 20 may write data indicating the weak color (or weak sub-color) into two least significant bits (LSB 2 bits) of color data of a pixel (e.g., a pixel at a coordinate (1, 1)) initially sent, in which the data may be, for example, '00', '01', and '10' indicating red color, green color, and blue color, respectively.

In addition, the host system 20 may also write information indicating the subsampling ratio N of the weak color (weak sub-color) into the two least significant bits of the color data, in which when N is, for example, 2, 4, 6, and 8, the information may be '00', '01', '10', and '11', respectively.

The host system may write information indicating the weak color (or weak sub-color) into two least significant bits of the first color data and write information indicating the subsampling ratio N applied to the weak color (or weak sub-color) into two least significant bits of the second color data, among the color data of the pixel at the coordinate (1, 1).

For reference, the pixel at the coordinate (1, 1) is located at the most corner of the display panel, and may be hidden by a bezel not to be displayed properly. Fluctuation of data in the two least significant bits is difficult for a user to recognize. Therefore, even when such information is written into the pixel at the coordinate (1, 1) and transmitted, image quality is hardly affected.

Figure 9:
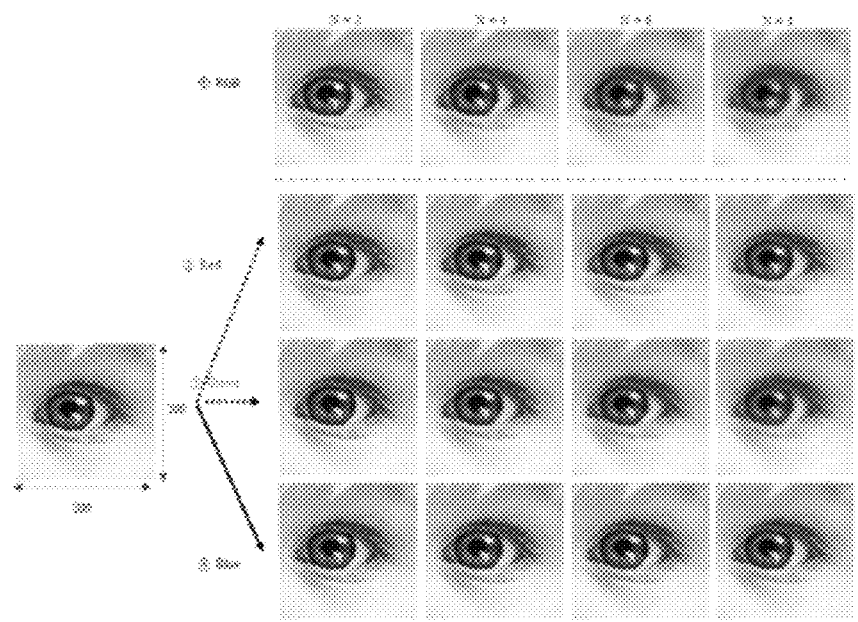
FIG. 9 is a view illustrating an effect of image quality and a reduction rate of data bandwidth according to the selection of subsampling color according to one embodiment.

FIG. 9 is a view illustrating an effect of image quality and a reduction rate of data bandwidth according to the selection of subsampling color;

In FIG. 9, four pictures in the first row are obtained by subsampling all three RGB colors at a subsampling ratio N of 2, 4, 6, and 8, respectively. Herein, it may be visually seen that as N increases, the amount of data decreases so that the data bandwidth decreases, but the image quality degrades.

In FIG. 9, the second row is obtained by subsampling a red color, the third row is obtained by subsampling a green color, and the fourth row is obtained by subsampling a blue color, the subsampling being performed at N=2, 4, 6, and 8, respectively.

The second and third rows obtained by subsampling the red color and green color has image quality problem such as color change, compared to that obtained by subsampling of all three RGB colors.

Meanwhile, the fourth row obtained by subsampling the blue color has the smallest degradation in image quality and thus may be selected as a weak color.

Herein, when the subsampling ratio N is 2, 4, 6, and 8, a reduction ratio of data bandwidth may be calculated as 25.0%, 31.3%, 32.4%, and 32.8%, respectively.

The timing controller 11 receives, from the host system 20, a WSSRGB in which the weak color (or weak sub-color) is subsampled to reduce data bandwidth, and reconstructs the WSSRGB into RGB' data in which each pixel includes all three color image data by interpolating the data of the weak color.

The timing controller 11 analyzes image data of a first pixel, that is, a pixel at a coordinate (1, 1) from the data WSSRGB transmitted from the host system 20, to obtain a weak sub-color and a subsampling ratio N, and interpolates the data of the weak color (or weak sub-color) using the weak sub-color and the subsampling ratio N, to reconstruct the data of the weak color in all pixels.

As the interpolation method, there are a nearest interpolation method using the nearest pixel value, a bilinear interpolation method using values and distance ratios of adjacent four pixels, and a bicubic interpolation method used by multiplying values of adjacent 16 pixels and a weight according to the distance.

Figure 10A:
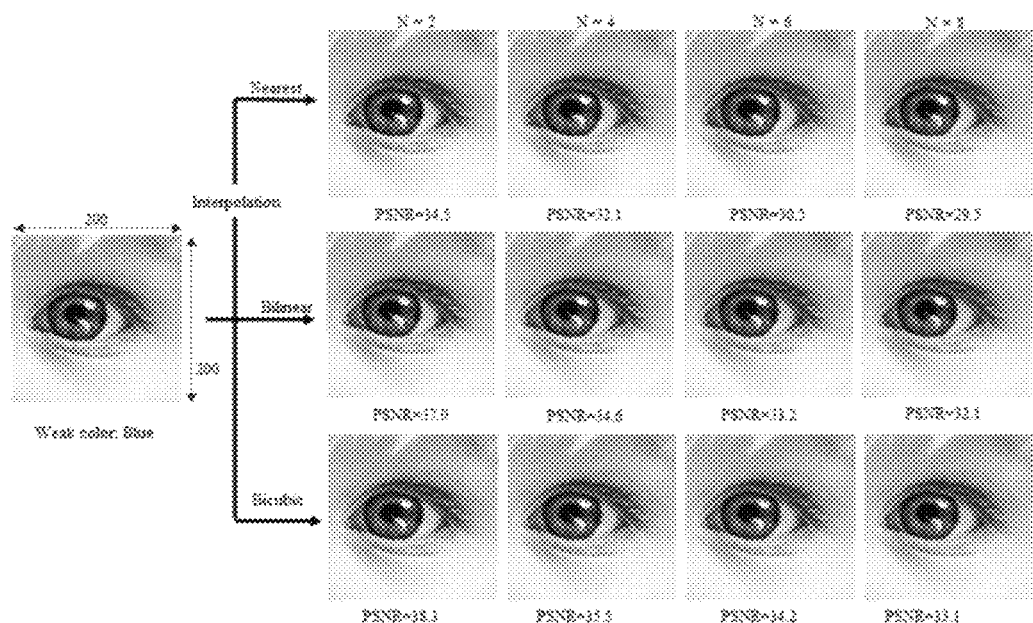
FIG. 10A is a view illustrating the difference in effects of image quality according to interpolation methods of reconstructing subsampling color according to one embodiment.
Figure 10B:
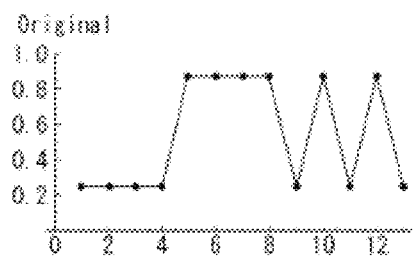
FIG. 10B is a graphical view illustrating the difference in results according to interpolation methods according to one embodiment.
Figure 10B:
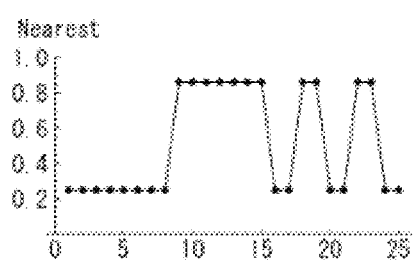
Figure 10B:
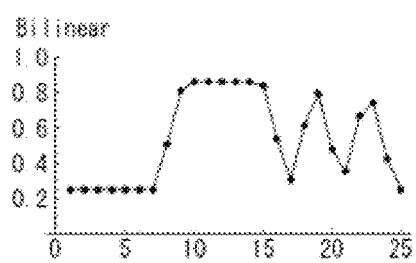
Figure 10B:
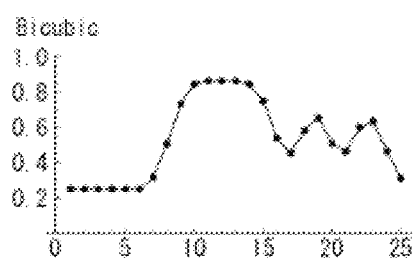

FIG. 10A is a view illustrating the difference in effects of image quality according to interpolation methods of reconstructing subsampling color; and FIG. 10B is a graphical view illustrating the difference in results according to interpolation methods.

In FIG. 10A, the first to third rows are obtained by reconstructing WSSRGB image data transmitted by using a blue color as a weak color (or weak sub-color) into pixel data using the closest interpolation method, the bilinear interpolation method, and the bicubic interpolation method, respectively. The number below the reconstructed image indicates a peak signal-to-noise ratio (PSNR) calculated for the reconstructed image.

In FIG. 10B, a horizontal axis indicates the number of pixels that are successively arranged, and a vertical axis indicates normalized gradation values in the pixels.

There are no significant differences in image quality in all three interpolation methods. However, by comparing the PSNR, it may be seen that the result of the bicubic interpolation method with a large amount of pixel data used for interpolation is best. As seen and predicted in FIG. 10A, it may be seen that the higher the subsampling ratio N, the lower the SNR. In addition, as shown in FIG. 10B, the connection of data between pixels is the most natural and smooth in the case of the bicubic interpolation method.

Figure 11:
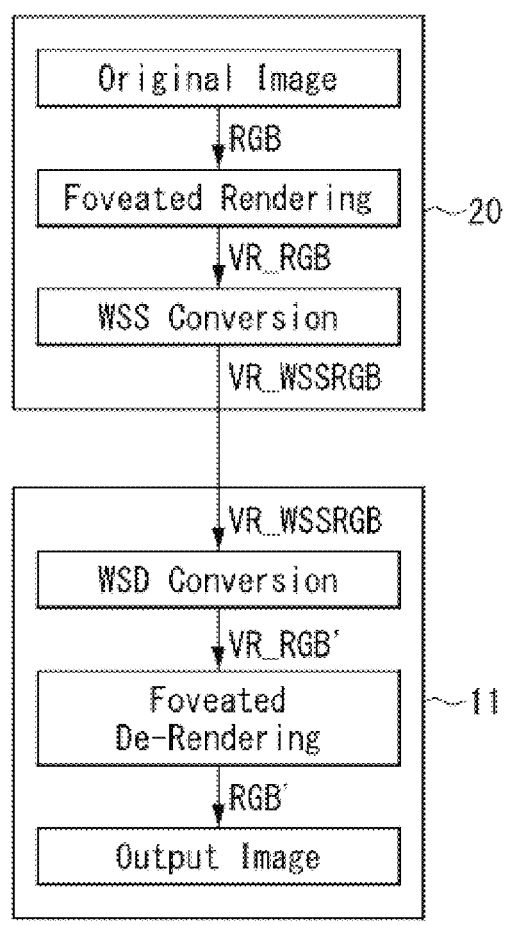
FIG. 11 is a view illustrating a configuration in which Foveated rendering technique used in a VR is applied to a configuration of FIG. 1 according to one embodiment.

FIG. 11 is a view illustrating a configuration in which Foveated rendering technique used in a VR is applied to a configuration of FIG. 1.

Since virtual reality (VR) content has a large amount of image data, data to be displayed in a focal region or a high-precision region and a peripheral region or a low-precision region are different in quality according to a recognition-based virtual reality (Foveated rendering) technique. A VR display device may display image data processed with high quality in a focus region and display image data processed with low quality in a peripheral region according to the Foveated rendering technique.

The data in the high-precision region may be processed with a high resolution, a large number of data bits allocated to each color, or a higher frame rate, compared to the data in the low-precision region.

The host system 20 applies the Foveated Rendering technique to the input image data RGB to obtain virtual reality image data VR_RGB, and additionally applies the WSS conversion technique of FIG. 1 to the virtual reality image data VR_RGB to subsample the weak color (or weak sub-color) with low contribution (WSS) and thus to obtain VR_WSSRGB image data and transmit the same to the timing controller 11, thereby suppressing an increase in the interface bandwidth.

When selecting the weak color (weak sub-color) with low contribution, the host system 20 may use the image data in high-precision region and the image data in low-precision region together, and apply the subsampling ratio N in common to both regions. Herein, information indicating the weak color and information indicating the subsampling ratio may be loaded in the image data of the first pixel in the low-precision region.

Alternatively, the host system 20 separates the image data in the high-precision region from the image data in the low-precision region from each other, to select the weak color (or weak sub-color) with low contribution separately for each region, and set the subsampling ratio N differently for each region. Herein, the weak color information and the subsampling ratio information in the low precision region may be loaded in first pixel in the low precision region.

Alternatively, the host system 20 may perform the WSS conversion by selecting the weak color (or weak sub-color) only for the image data in high-precision region, and may not perform the WSS conversion for the image data in low-precision region.

The information on the weak color and the subsampling ratio in the high-precision region may be loaded in the image data of the first pixel in the high-precision region or loaded in the image data of the first pixel or second pixel in the low-precision region. In general, since the low precision region is disposed around the screen and the high precision region is disposed in the center of the screen, it may be advantageous to load the above information in the image data of pixels in the low precision region.

The timing controller 11 analyzes the VR_WSSRGB image data received from the host system 20 to check the weak color and the subsampling ratio, and performs a reconstruction (WSD conversion) operation in such a manner as to interpolate and reconstruct the image data of the subsampled weak color and to reconstruct the image data of the remaining colors as it is, thereby obtaining VR_RGB' image data.

Herein, when the subsampling is applied differently to the high-precision region and the low-precision region with respect to the VR_WSSRGB image data received from the host system 20, the timing controller 11 may perform reconstruction operations separately for data in the high-precision region and the low-precision region.

The timing controller 11 converts the VR_RGB' image data in the high-precision region and the low-precision region reconstructed from subsampling into RGB' image data to be displayed in one frame by applying a Foveated de-rendering technique, and outputs the same to the display panel 10 through the data driving circuit 12 and the gate driving circuit 13 as an output image.

Therefore, even in a VR device having a large amount of data, it is possible to suppress an increase in data transmission bandwidth while reducing image quality degradation.

Figure 12:
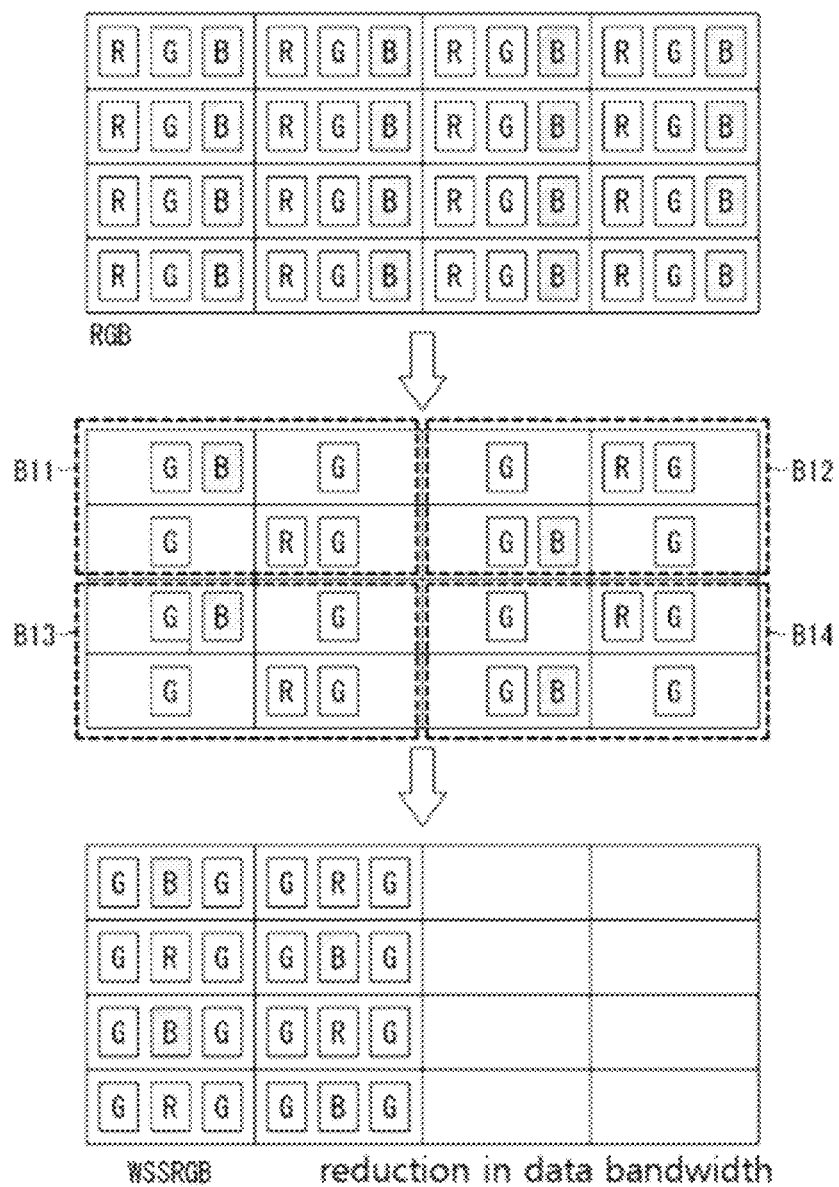
FIG. 12 is a view illustrating an example in which a data bandwidth is reduced when sub-sampling and transmitting R color and B color image data according to one embodiment.

FIG. 12 is a view illustrating an example in which a data bandwidth is reduced when sub-sampling and transmitting image data of R color and B color. In FIG. 3, image data of only one color is subsampled, but in some cases, even when image data of two colors is subsampled and transmitted, the quality of the image may not be degraded.

In FIG. 3, the data line may be reduced from four ports to three ports by subsampling image data of one color. However, in FIG. 12, since the image data of two colors is subsampled, the data line may be further reduced from four ports to two ports.

In FIG. 12, in each image block composed of four pixels, image data of only one pixel is sampled for B color and R color, and all pixels are sampled for G color. In the first and third blocks B11 and B13 on the left, B color and R color are sampled in pixels at (1, 1) and (2, 2), respectively, and in the second and fourth blocks B12 and B04 on the right, B color and R color are sampled in pixels at (2, 1) and (1, 2), respectively.

When a weighted sum value of each of two colors is smaller than a first reference value, among weighted sum values of each color, the color selector 25 may select two colors as a weak color.

When sub-sampling and transmitting image data of two colors, the host system 20 writes data indicating the first and second weak colors (or weak sub-color) in two least significant bits of two color data sent initially and loads information indicating a subsampling ratio N of the weak color (or weak sub-color) in two least significant bits of the third color data.

Figure 13A:
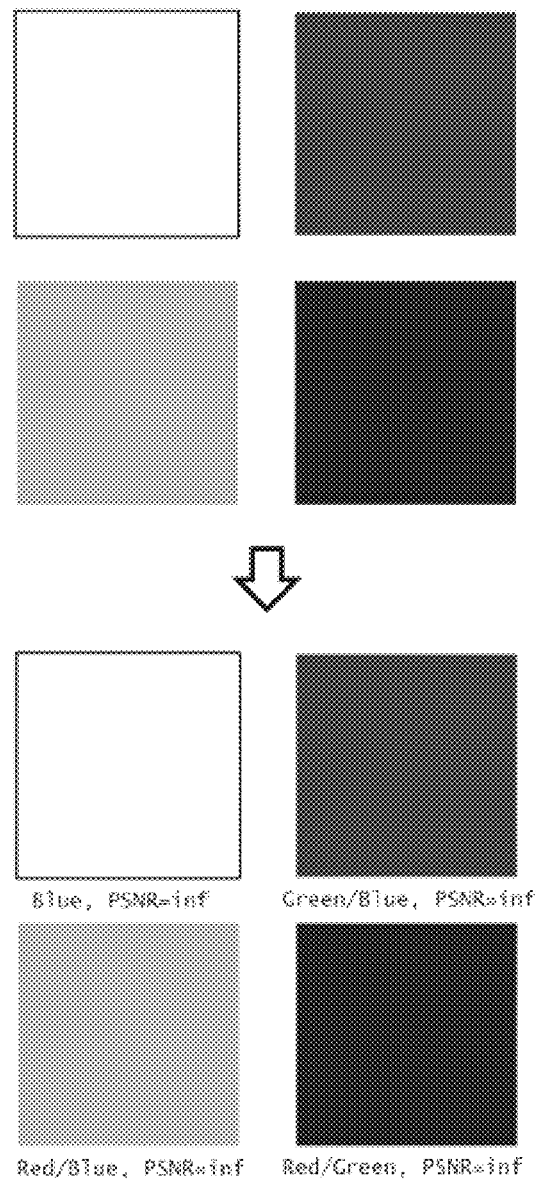
FIGS. 13A and 13B are views illustrating simulation results of images of various special patterns according to one embodiment.
Figure 13B:
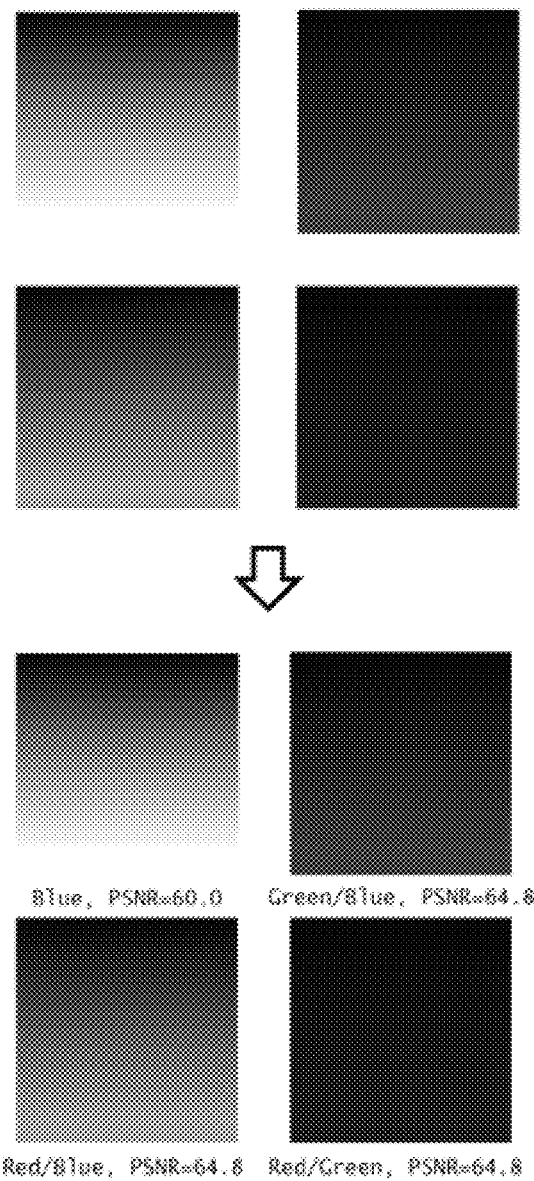

FIGS. 13A and 13B are views illustrating simulation results of images of various special patterns.

FIG. 13A shows a screen result obtained by subsampling image data of one color for a solid pattern with a single color of the same gradation and interpolating the same again. A text below the reconstructed screen is a weak color obtained by performing subsampling and a PSNR.

In the case of the solid pattern, since all pixel values are the same, the same result is obtained even when the image data of any color is subsampled and then reconstructed, and thus a SNR is infinite (Inf). When the screen is composed of only one color among solid patterns, the gradation values of the other two colors are both zero, and thus there are two weak colors, in which selecting any color gives the same result.

In the case of a white pattern, R, G, and B colors all have 255 gradations. Since a blue color has the smallest sensitivity weight described with reference to FIG. 7, the blue color may be selected as a weak color.

The screen of FIG. 13B is composed of a single color, the screen being a gradient pattern that gradually changes in gradation in one direction. In the case of the gradient pattern, since the gradation gradually increases or decreases in the horizontal or vertical direction, there is little difference in image quality even when subsampling is performed and then reconstruction is performed.

When the screen is composed of only one color among the gradient patterns, the gradation values of the other two colors are all zero, and thus there are two weak colors, in which selecting any color produces the same result.

In the case of the white gradient pattern, the gradation of R, G, and B colors are all the same, vertically to a gradient progression direction. However, since the blue color has the smallest sensitivity weight, the blue color may be selected as the weak color.

There is little difference depending on whether the gradient direction is vertical or horizontal.

Meanwhile, the host system 20 converts the input image data of three RGB colors to image data of four R'G'B'W colors, selects one or two colors with low contribution to luminance for R'G'B' image data from among the converted R'G'B'W image data, as shown in FIG. 1, subsamples the image data of the selected color, and transmits color data not subsampled together with white image data.

The timing controller 11 may interpolate the image data of the subsampled color to reconstruct the image data, and output the resulting data to a display panel in which a pixel unit is composed of sub-pixels of four RGBW colors.

The display device described in the specification can be described as follows.

A display device according to an embodiment includes a host system subsampling and transmitting data of a first color among a plurality of colors of input image data; a timing controller interpolating the data of the subsampled first color in data received from the host system to reconstruct the image data and outputting the reconstructed image data; a display panel having a plurality of pixels connected to a gate line and a data line; and a driving circuit driving the gate line and the data line under a control of the timing controller to supply data voltages corresponding to the reconstructed image data to the plurality of pixels.

According to an embodiment, the host system may select, as the first color, a color with the lowest contribution to luminance when displaying an image frame composed of the image data on the display panel.

According to an embodiment, the host system may include a color separator separating the input image data into image data of the plurality of colors; a summer summing data of all pixels included in the image frame for each of the plurality of colors to obtain a sum value of the corresponding color; a weight calculator calculating weighted sum values by multiplying the sum value of the corresponding color by a sensitivity weight of the corresponding color for each color; and a selector selecting a color having a smallest value among the weighted sum values as the first color.

According to an embodiment, the host system may further include a luminance domain converter converting the image data of the plurality of colors resulting from the separation by the color separator into luminance domain data, wherein the summer sums the luminance data resulting from the conversion by the luminance domain converter for all pixels to obtain the sum value of the corresponding color.

According to an embodiment, the summer may multiply data of a color having a minimum value in each pixel by a minimum weight, when data of all pixels for each color is summed to obtain the sum value of each color.

According to an embodiment, the selector may select, as the first color, two colors having a value smaller than a first reference value from among the weighted sum values.

According to an embodiment, the host system may write information indicating the first color into a least significant bit of second color data among data of a first pixel of pixels included in the image frame and transmits the same.

According to an embodiment, the host system may write information indicating a ratio of subsampling the first color into a least significant bit of color data different from the second color data among the data of the first pixel and transmits the same.

According to an embodiment, the timing controller may analyze the data received from the host system to check the first color and the ratio from the data of the first pixel, and interpolate data of the first color extracted according to the ratio to reconstruct the data of the first color for each pixel.

According to an embodiment, the host system may convert an image frame constituted by the image data into virtual reality image data according to a recognition-based virtual reality technique, and subsample data of the first color in the virtual reality image data.

According to an embodiment, the host system may divide the image frame into a first region and a second region and processes image data in the first region with higher quality than image data in the second region, and select the first color for the image data of the first region and subsample the data of the first color.

According to an embodiment, the host system may write data indicating the first color into a least significant bit of data of a first pixel in the first region and transmits the same, or write data indicating the first color into a least significant bit of data of a first pixel in the second region and transmits the same.

An image processing method in a display device according to another embodiment includes selecting, as a first color, a color with least contribution to luminance from among a plurality of colors of input image data when displaying an image frame composed by the image data; subsampling data of the first color; maintaining data of remaining colors except the first color of the plurality of colors as it is to transmit the resulting data together with the subsampled data of the first color; interpolating the subsampled data of the first color; and reconstructing the data of the remaining colors as it is to output the resulting data to the display panel together with the interpolated data of the first color.

According to an embodiment, the selecting may include summing data of all pixels included in the image frame for each of the plurality of colors to obtain a sum value of the corresponding color; obtaining a weighted sum value by multiplying the sum value of the corresponding color with a sensitivity weight of the corresponding color for each color; and selecting a color having a smallest value among the weighted sum values, two colors having a value smaller than a first reference value among the weighted sum values, or two colors having a value smaller than a largest value by a second reference value or more among the weighted sum values, as the first color.

According to an embodiment, the selecting may include summing data of all pixels included in the image frame for each of the plurality of colors to obtain a sum value of the corresponding color; obtaining a weighted sum value by multiplying the sum value of the corresponding color with a sensitivity weight of the corresponding color for each color; and selecting a color having a smallest value among the weighted sum values, as the first color.

According to an embodiment, the transmitting may include writing the information indicating the first color into a least significant bit of second color data among data of a first pixel of pixels included in the image frame and transmitting the same.

According to an embodiment, the transmitting may include writing information indicating a ratio of subsampling the first color into a least significant bit of color data different from the second color data among the data of the first pixel and transmitting the same.

Through the above description, those skilled in the art will appreciate that various changes and modifications are possible without departing from the technical spirit of the present invention. Therefore, the technical scope of the present invention is not limited to the contents described in the detailed description of the specification, but should be determined by the scope of the claims.

What is claimed is:

1. A display device, comprising:
a host system subsampling and transmitting data of a first color among a plurality of colors of input image data;
a timing controller interpolating the data of the subsampled first color in data received from the host system to reconstruct the input image data and outputting the reconstructed input image data;
a display panel having a plurality of pixels connected to a plurality of gate lines and a plurality of data lines; and
a driving circuit driving the gate line and the data line under a control of the timing controller to supply data voltages corresponding to the reconstructed input image data to the plurality of pixels,
wherein the host system selects, as the first color, a color with a lowest contribution to luminance when displaying an image frame composed of the input image data on the display panel,
wherein the host system writes information indicating the first color into a least significant bit of second color data among data of a first pixel of the plurality of pixels included in the image frame and transmits the information,
wherein the host system writes information indicating a ratio of subsampling the first color into a least significant bit of color data different from the second color data among the data of the first pixel and transmits the same.

2. The display device of claim 1, wherein the host system includes:
a color separator separating the input image data into image data of the plurality of colors;
a summer summing data of all pixels included in the image frame for each of the plurality of colors to obtain a sum value of a corresponding color;
a weight calculator calculating weighted sum values by multiplying the sum value of the corresponding color by a sensitivity weight of the corresponding color for each color; and
a selector selecting a color having a smallest value among the weighted sum values as the first color.

3. The display device of claim 2, wherein the host system further includes:
a luminance domain converter converting the input image data of the plurality of colors resulting from the separation by the color separator into luminance domain data,
wherein the summer sums the luminance domain data resulting from the conversion by the luminance domain converter for all of the plurality of pixels to obtain the sum value of the corresponding color.

4. The display device of claim 2, wherein the summer multiplies data of a color having a minimum value in each pixel of the plurality of pixels by a minimum weight, when summing data of all of the plurality of pixels for each color to obtain the sum value of each color.

5. The display device of claim 2, wherein the selector selects, as the first color, two colors having a value smaller than a first reference value from among the weighted sum values.

6. The display device of claim 1, wherein the timing controller analyzes the data received from the host system to check the first color and the ratio from the data of the first pixel, and interpolates data of the first color extracted according to the ratio to reconstruct the data of the first color for each pixel.

7. The display device of claim 1, wherein the host system converts an image frame constituted by the input image data into virtual reality image data according to a recognition-based virtual reality technique, and subsamples data of the first color in the virtual reality image data.

8. The display device of claim 7, wherein the host system divides the image frame into a first region and a second region and processes image data in the first region with higher quality than image data in the second region, and
selects the first color for the image data of the first region and subsamples the data of the first color.

9. The display device of claim 8, wherein the host system writes data indicating the first color into a least significant bit of data of a first pixel in the first region and transmits the data, or writes data indicating the first color into a least significant bit of data of a first pixel from the plurality of pixels in the second region and transmits the data.

10. An image processing method in a display device, the method comprising:
selecting, as a first color, a color with least contribution to luminance from among a plurality of colors of input image data when displaying an image frame composed by the image data;
subsampling data of the first color;
maintaining data of remaining colors except the first color of the plurality of colors to transmit the data together with the subsampled data of the first color;
interpolating the subsampled data of the first color; and
reconstructing the data of the remaining colors to output the reconstructed data to a display panel of the display device together with the interpolated data of the first color,
wherein the transmitting includes:
writing information indicating the first color into a least significant bit of second color data among data of a first pixel of the plurality of pixels included in the image frame and transmitting the information, and
writing information indicating a ratio of subsampling the first color into a least significant bit of color data different from the second color data among the data of the first pixel and transmitting the information.

11. The method of claim 10, wherein the selecting includes:
summing data of all of the plurality of pixels included in the image frame for each of the plurality of colors to obtain a sum value of a corresponding color;
obtaining a weighted sum value by multiplying the sum value of a corresponding color with a sensitivity weight of the corresponding color for each color; and
selecting a color having a smallest value among the weighted sum values, two colors having a value smaller than a first reference value among the weighted sum values, or two colors having a value smaller than a largest value by a second reference value or more among the weighted sum values, as the first color.

12. The method of claim 11, wherein the obtaining of the sum value includes:

multiplying data of a color with a minimum value in each pixel by a minimum weight when summing the data of all pixels of the plurality of pixels for each color to obtain the sum value of each color.

* * * * *